(12) United States Patent
Hunter et al.

(10) Patent No.: US 7,768,559 B2
(45) Date of Patent: *Aug. 3, 2010

(54) POSITIONAL GAIN ADJUSTMENT AND SURFACE GENERATION FOR IMAGE PROCESSING

(75) Inventors: Gregory Michael Hunter, San Jose, CA (US); Robert H. Mullis, Soquel, CA (US); William R. Dirks, Fremont, CA (US); Dmitri Jerdev, South Pasadena, CA (US); Alexander Mokhnatyuk, South Pasadena, CA (US); Ilia Ovsiannikov, Studio City, CA (US)

(73) Assignee: Aptina Imaging Corporation, Grand Caymans (KY)

( * ) Notice: Subject to any disclaimer, the term of this patent is extended or adjusted under 35 U.S.C. 154(b) by 371 days.

This patent is subject to a terminal disclaimer.

(21) Appl. No.: 11/700,092

(22) Filed: Jan. 31, 2007

(65) Prior Publication Data

US 2008/0055446 A1   Mar. 6, 2008

Related U.S. Application Data

(62) Division of application No. 11/514,307, filed on Sep. 1, 2006.

(51) Int. Cl.
*H04N 9/64* (2006.01)
(52) U.S. Cl. ............... 348/251; 348/335; 348/340; 348/222.1
(58) Field of Classification Search .................. None
See application file for complete search history.

(56) References Cited

U.S. PATENT DOCUMENTS

| 6,094,221 | A | 7/2000 | Andersion |
| 6,747,757 | B1 | 6/2004 | Enomoto |
| 6,912,307 | B2* | 6/2005 | Spitzer et al. ............ 382/167 |
| 2002/0094131 | A1* | 7/2002 | Shirakawa ............... 382/274 |
| 2003/0234864 | A1* | 12/2003 | Matherson et al. ......... 348/175 |
| 2004/0032952 | A1* | 2/2004 | Pinto et al. ................. 380/54 |
| 2004/0155970 | A1 | 8/2004 | Johannesson et al. |
| 2005/0041806 | A1* | 2/2005 | Pinto et al. ................ 380/210 |
| 2005/0179793 | A1 | 8/2005 | Schweng |
| 2006/0033005 | A1 | 2/2006 | Jerdev et al. |
| 2007/0211154 | A1 | 9/2007 | Mahmoud |

OTHER PUBLICATIONS

Manoj Aggarwal et al., "On Cosine fourth and Vignetting Effects in Real Lenses", 2001 IEEE, pp. 472-479.
Ian Powell, "Technique employed in the development of antivignetting filters", Opt. Eng. 36 (1) 268-272, Jan. 1997.

(Continued)

*Primary Examiner*—David L Ometz
*Assistant Examiner*—Angel L Garces-Rivera
(74) *Attorney, Agent, or Firm*—Dickstein Shapiro LLP

(57) ABSTRACT

Surface generation and positional gain adjustment techniques for an imager are described. Embodiments of the techniques use zones having flexible boundaries which can be reconfigured depending upon the type of lens being used in a given application. Each pixel within each zone is multiplied by a correction factor dependent upon the particular zone while the pixel is being read out from the array. The correction factors comprise coefficients that are different for each color channel and in some instances different for each corner of each color channel.

14 Claims, 10 Drawing Sheets

OTHER PUBLICATIONS

Wonpil Yu et al., "Vignetting Distortion Correction Method for High Quality Digital Imaging", Proceeding of the 17th International Conference on Pattern Recognition (ICPR '04).

Wonpil Yu, "Practical Anti-vignetting Methods for Digital Cameras", IEEE Transactions on Consumer Electronics, vol. 50, No. 4, Nov. 2004.

Yin-Pao Chen et al., "An Anti-Vignetting Technique for Super Wide Field of View Mosaicked Images", Journal of Imaging Technology, vol. 12, No. 5, Oct. 1986.

M. Onoe, et al., "Real-Time Shading Corrector for a Television Camera Using a Microprocessor", Real-Time/Parallel Computing, Volume: Plenum: NY, pp. 339-346, 1981.

Its'hak Dinstein et al., "Imaging System Response Linearization and Shading Correction", 1984, IEEE, pp. 204-209.

Solene Quelard, "Image Quality Improvement for a CMOS Mobile Phone Digital Camera", Royal Institute of Technology, Feb. 2004, pp. 1-71.

* cited by examiner

POSITIONAL GAIN ADJUSTMENT AND SURFACE GENERATION FOR IMAGE PROCESSING

CROSS-REFERENCE TO RELATED APPLICATIONS

This application is a divisional of U.S. patent application Ser. No. 11/514,307, filed on Sep. 1, 2006, the subject matter of which is incorporated in its entirety by reference herein.

FIELD OF THE INVENTION

Generally, embodiments of the invention relate to surface generation and positional gain adjustment and their applications within the field of image processing.

BACKGROUND OF THE INVENTION

A CMOS image sensor is an imaging device built with CMOS technology for capturing and processing light signals. Results produced by the CMOS image sensor can be displayed. A type of CMOS image sensor, called a CMOS Active Pixel Sensor (APS), has been shown to be particularly suited for handheld imaging applications.

CMOS imagers comprise an array of pixel circuits, each of which determines a value for a corresponding image pixel of an image focused on the array. Each pixel circuit includes a photosensitive element or photosensor (e.g., a photodiode or a photogate) for sensing/detecting photons, and may include active transistors (e.g., an amplifier) for reading out and amplifying signals representing a "captured" image.

A CMOS imager may also be used to capture color images. In this case, the array of pixel circuits may employ a color filter array (CFA) to separate red, green, and blue information from a received color image. For example, each pixel circuit may be covered with a red (R), a green (G), or a blue (B) filter, according to a specific pattern, e.g., the "Bayer" CFA pattern. Additional color patterns, including but are not limited to Cyan Magenta Yellow (CMY), Cyan Magenta Yellow Black (CMYK), or Red Green Blue Indigo (RGBI), can be used in imager devices.

As a result of the filtering, each pixel of the color image captured by a CMOS imager having a CFA corresponds to only one color. FIG. 1 illustrates the Bayer scheme for pixel array 20. According to the illustrated Bayer pattern, even rows, Row0 and Row2, for example, contain alternating green 22 (designated as Gr) and red 24 (designated as R) pixels. Odd rows, e.g., Row1 contain alternating blue 26 (designated as B) and green 28 (designated as Gb) pixels.

Typically, while a given red pixel circuit has data that may be used to form an R channel, i.e., the R component of an image, it does not have the kinds of data fundamental to forming a B or G channel. The analogous statement is true for each pixel circuit of another color channel. To determine the R value for a B pixel, and analogously for other combinations, the "missing" R value is estimated by a technique called interpolation whereby R values from selected R pixels near the B pixel are employed in order to estimate the R value that would have been formed by the B pixel, had it been an R pixel. In this way, R, G, and B values may be obtained for every pixel.

Many components of an integrated circuit imaging device, due to imperfections or practical limitations or variations in their designs and layout, etc., may interact to contribute to spatial variation in signal values, depending upon a pixel's location, i.e., sensitivity variation over the array. Further, it is known that a given lens may contribute to the pixel circuits' having varying degrees of sensitivity depending upon their geometric locations in the array. In addition, variations in the shape and orientation of and other elements of the pixel circuits may also contribute to non-uniformity of pixel sensitivity across the imager. This phenomenon can adversely affect the images produced by the imager.

Often times these variations can be measured and partially corrected as they mostly depend on the lens design used and generally do not vary from part to part. Such correction can be done in post-processing of already-acquired image data or during image acquisition (i.e., as the image is read out from the imager).

U.S. patent application Ser. No. 10/915,454 (published as U.S. Patent Application Pub. no. 2006/0033005) proposes a correction scheme for non-uniform sensitivity in the imager array. There is a need and desire in the art for additional image correction methods.

DETAILED DESCRIPTION OF THE INVENTION

In the following detailed description, reference is made to the accompanying drawings which form a part hereof, and in which are shown by way of illustration of specific embodiments in which the invention may be practiced. These embodiments are described in sufficient detail to enable those of ordinary skill in the art to make and use them, and it is to be understood that structural, logical or procedural changes may be made to the specific embodiments disclosed herein.

As explained above, there are variations in imaging devices. One known spatial variation is that, along a given radius, the farther away from the center of the imager, the more attenuated the signal from a given pixel circuit. As such, more correction is required in order to reduce spatial variation. By gaining attenuated signals, according to position, embodiments of the invention perform "Positional Gain Adjustment," or "PGA." A function that maps pixel position into a desired correction amount is referred to herein as a "correction surface." Such a surface may be generated in a CMOS circuit, in one embodiment, and then used for correction of spatial non-uniformity of sensitivity (PGA), or to guide some other correction function. For example, crosstalk correction can use a surface for each parameter of adjustment desired.

Figure 1:
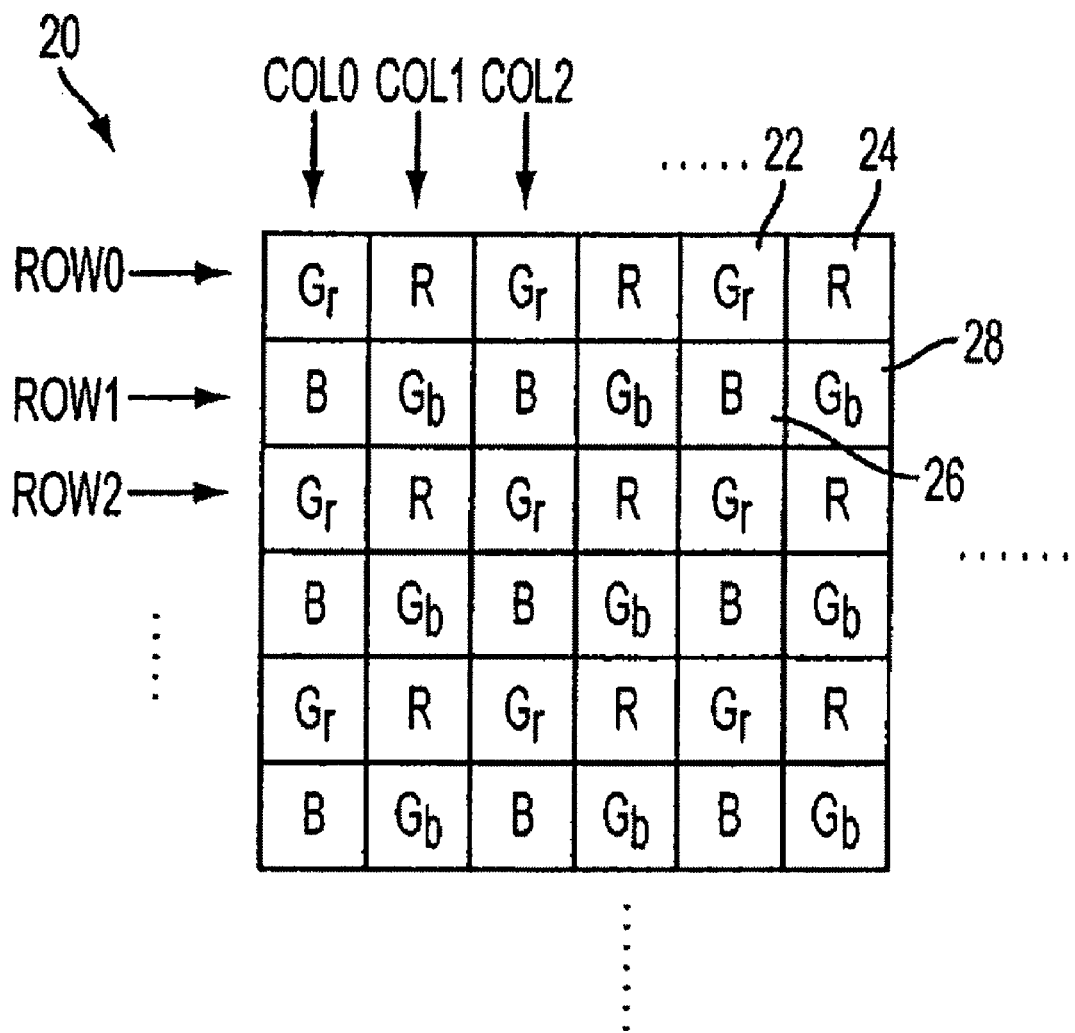
FIG. 1 depicts a prior art Bayer pattern for a pixel array.
Figure 2:
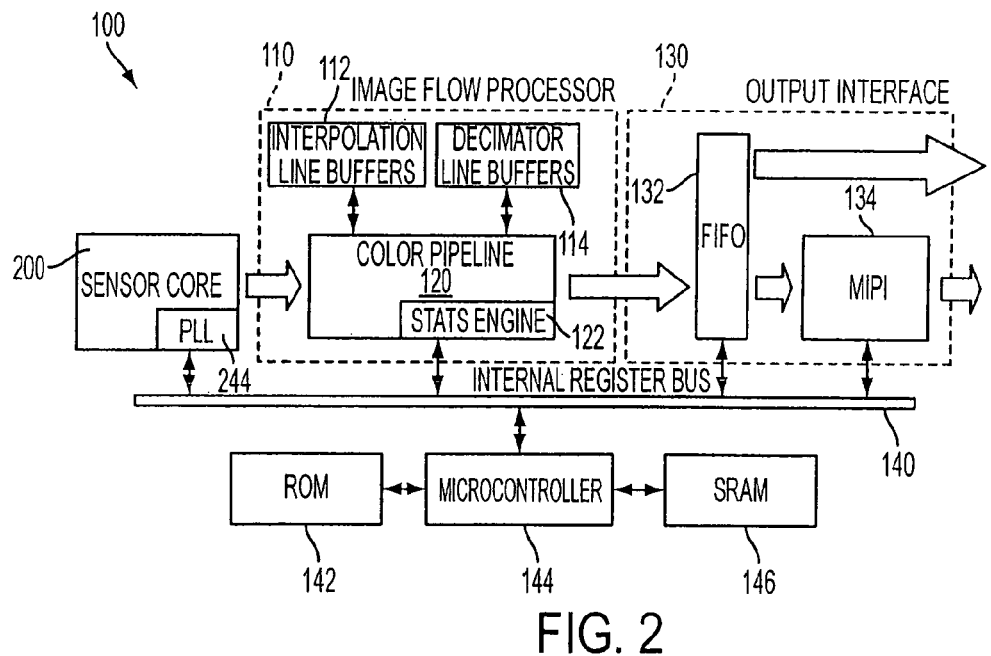
FIG. 2 illustrates a block diagram of system-on-a-chip image sensor constructed in accordance with an embodiment of the invention.

By way of example, FIG. 2 illustrates a block diagram of system-on-a-chip (SOC) image sensor 100 constructed in accordance with an embodiment of the invention. The sensor 100 comprises a sensor core 200 that communicates with an image flow processor 110 that is also connected to an output interface 130. A phase locked loop (PLL) 244 is used as a clock for the sensor core 200. The image flow processor 110, which is responsible for image and color processing, includes interpolation line buffers 112, decimator line buffers 114 and a color pipeline 120. The color pipeline 120 includes, among other things, a statistics engine 122. One of the functions of the color pipeline 120 is positional gain adjustment (described below in more detail). The output interface 130 includes an output first-in-first-out (FIFO) parallel output 132 and a serial Mobile Industry Processing Interface (MIPI) output 134. The user can select either a serial output or a parallel output by setting registers within the chip. An internal register bus 140 connects read only memory (ROM) 142, a microcontroller 144 and a static random access memory (SRAM) 146 to the sensor core 200, image flow processor 110 and the output interface 130.

Figure 3:
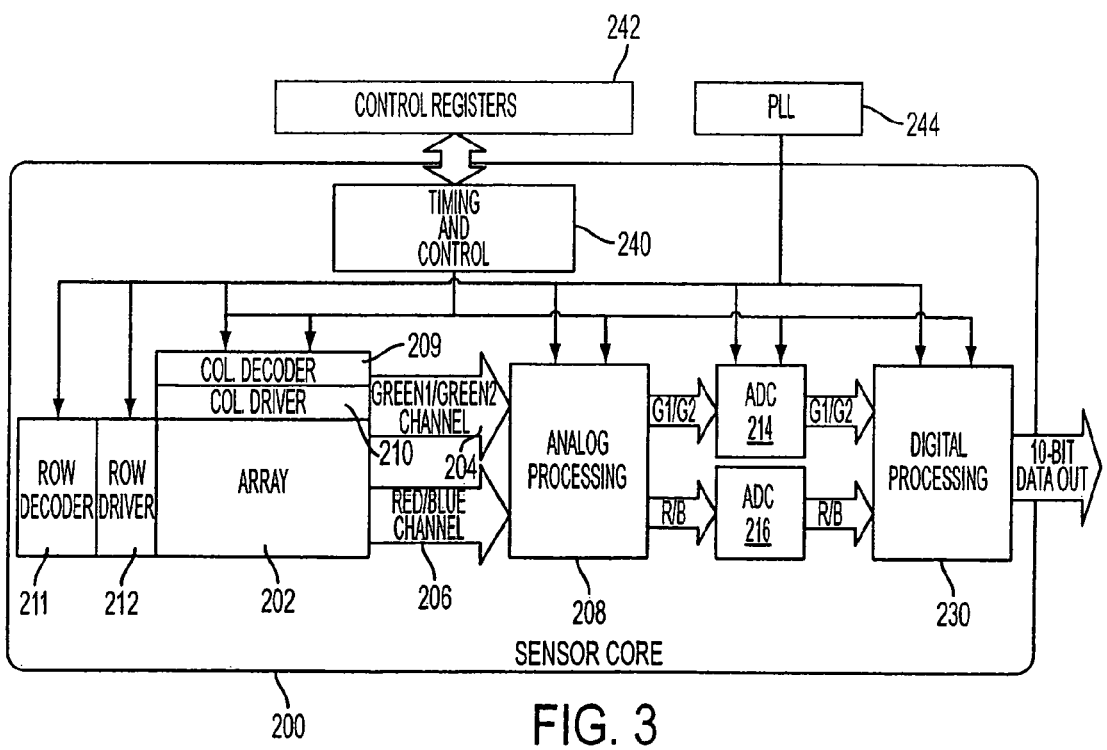
FIG. 3 illustrates an exemplary sensor core.

By way of example, FIG. 3 illustrates a sensor core 200 used in the FIG. 2 sensor 100. The sensor core 200 includes a pixel array 202, which is connected to analog processing circuitry 208 by a green1/green2 channel 204 and a red/blue channel 206. Although only two channels 204, 206 are illustrated, there are effectively two green channels, one R channel, and one B channel, for a total of four channels. The green1 (i.e., Gr) and green2 (i.e., Gb) signals are readout at different times (using channel 204) and the red and blue signals are readout at different times (using channel 206). The analog processing circuitry 208 outputs processed green1/green2 signals G1/G2 to a first analog-to-digital converter (ADC) 214 and processed red/blue signals R/B to a second analog-to-digital converter 216. The outputs of the two analog-to-digital converters 214, 216 are sent to a digital processor 230.

Connected to, or as part of, the array 202 are row and column decoders 211, 209 and row and column driver circuitry 212, 210 that are controlled by a timing and control circuit 240. The timing and control circuit 240 uses control registers 242 to determine how the array 202 and other components are controlled. As set forth above, the PLL 244 serves as a clock for the components in the core 200.

The array 202 comprises a plurality of pixel circuits arranged in a predetermined number of columns and rows. In operation, the pixel circuits of each row in array 202 are all turned on at the same time by a row select line and the pixel circuits of each column are selectively output onto column output lines by a column select line. A plurality of row and column lines are provided for the entire array 202. The row lines are selectively activated by row driver circuitry 212 in response to the row address decoder 211 and the column select lines are selectively activated by a column driver 210 in response to the column address decoder 209. Thus, a row and column address is provided for each pixel circuit. The timing and control circuit 240 controls the address decoders 211, 209 for selecting the appropriate row and column lines for pixel readout, and the row and column driver circuitry 212, 210, which apply driving voltage to the drive transistors of the selected row and column lines.

Each column contains sampling capacitors and switches in the analog processing circuit 208 that read a pixel reset signal Vrst and a pixel image signal Vsig for selected pixel circuits. Because the core 200 uses green1/green2 channel 204 and a separate red/blue channel 206, circuitry 208 will have the capacity to store Vrst and Vsig signals for green1/green2 and red/blue pixel signals. A differential signal (Vrst−Vsig) is produced by differential amplifiers contained in the circuitry 208 for each pixel. Thus, the signals G1/G2 and R/B are differential signals that are then digitized by a respective analog-to-digital converter 214, 216. The analog-to-digital converters 214, 216 supply digitized G1/G2, R/B pixel signals to the digital processor 230, which forms a digital image output (e.g., a 10-bit digital output). The output is sent to the image flow processor 110 (FIG. 2), which will, among other things, perform positional gain adjustment on the digital pixel values as is discussed below in more detail.

The layout and/or design of pixels of the various channels may be different, including between the two green channels, and the two G channels' pixels typically have different spatial relationships to the blue and red channels, resulting in different crosstalk patterns, and for these reasons and other reasons affecting non-uniformity of signal response between channels, the signal responses of the two green channels may be different. By applying different PGA correction surfaces to each green channel, artifacts resulting from the two different responses may be reduced, in many cases. Further embodiments include multiple pixel arrays, for example, one for each channel (R/B and G1/G2), one for each color (R, B, G1, G2), and one for all R, B, G1, and G2 channels. Embodiments of the invention also include separate correction surfaces for each channel, due to different layouts of pixels, per channel, different pixel locations per channel, with respect to such things as including but not limited to optics, different lenses, or when different arrays are used per channel.

Although the sensor core 200 has been described with reference to use with an APS CMOS pixel array, this is merely one example sensor core that may be used. Embodiments of the invention may also be used with other sensor cores having a different readout architecture. For example, a CCD (Charge Coupled Device) core could also be used, which supplies pixel signals for processing to an image flow signal processor 110.

Figure 4A:
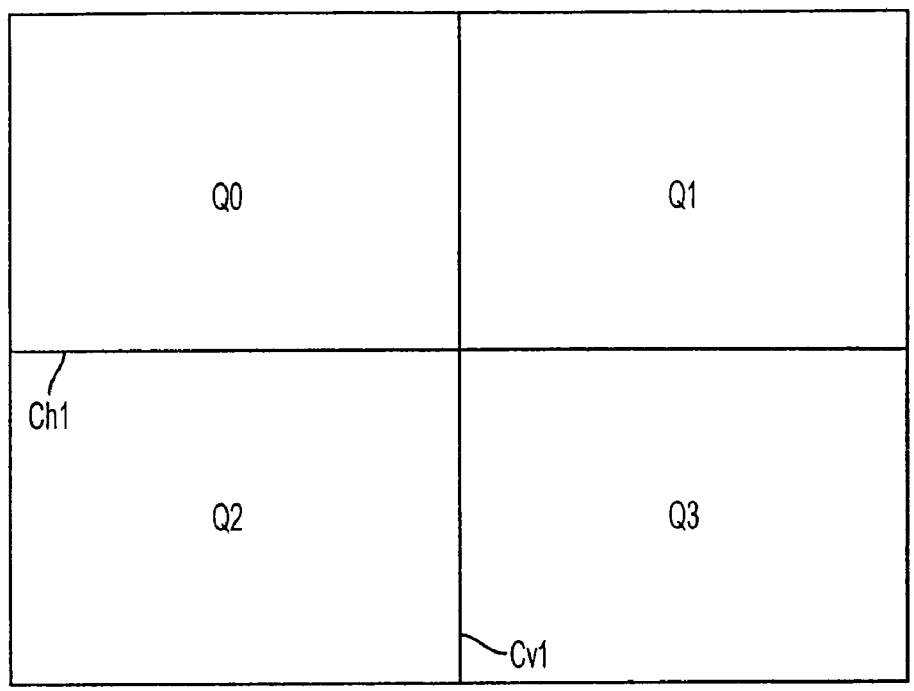
FIG. 4a illustrates how an image can be divided into quadrants or corners.
Figure 4B:
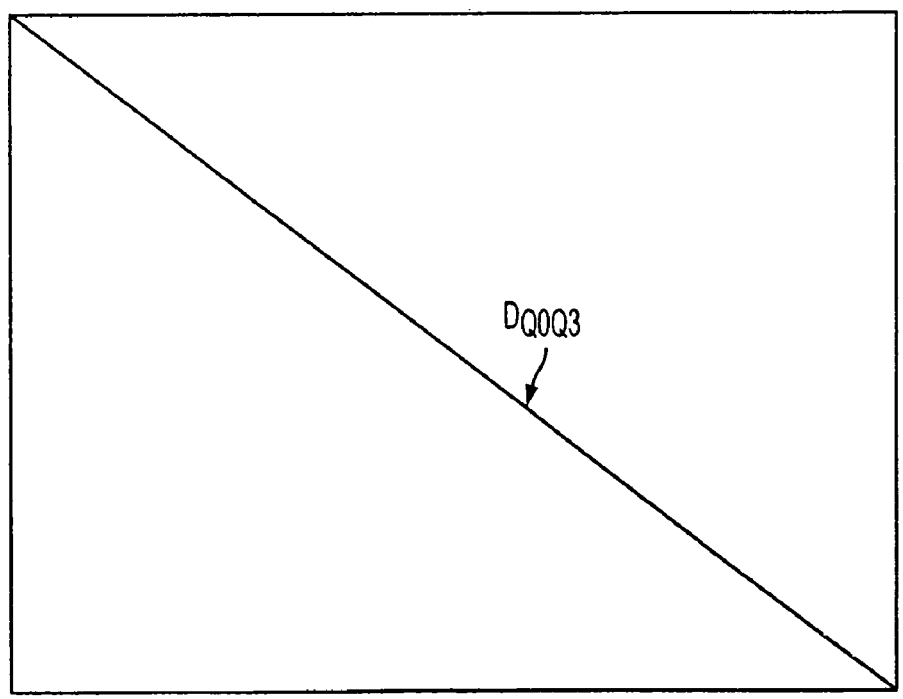
FIG. 4b illustrates a diagonal from one FIG. 4a quadrant to another FIG. 4a quadrant.

FIG. 4a illustrates how an image can be divided into quadrants Q0, Q1, Q2, Q3. These quadrants Q0, Q1, Q2, Q3 may be referred to as "corners". The quadrants Q0, Q1, Q2, Q3 are obtained by dividing an image along a "center" horizontal line Ch1 and a "center" vertical line Cv1. Quadrant Q0 is the upper left portion of the image. Quadrant Q1 is the upper right portion of the image. Quadrant Q2 is the lower left portion of the image and quadrant Q3 is the lower right portion of the image. It should be appreciated that each quadrant may be a different size since the "center" lines Ch1, Cv1 could be on lens region boundaries, superimposed on the image, and only roughly define the effective optical center, or the "peak value," which may vary for each channel. The "center" for each channel can be significantly off-center, and may not match zone boundaries. FIG. 4b illustrates a diagonal $D_{Q0Q3}$ from quadrant Q0 to quadrant Q3. Diagonals such as the diagonal $D_{Q0Q3}$ are sometimes used during calibration and other procedures. It should be appreciated that there is another diagonal that spans from Quadrant Q1 to Quadrant Q2.

Figure 5:
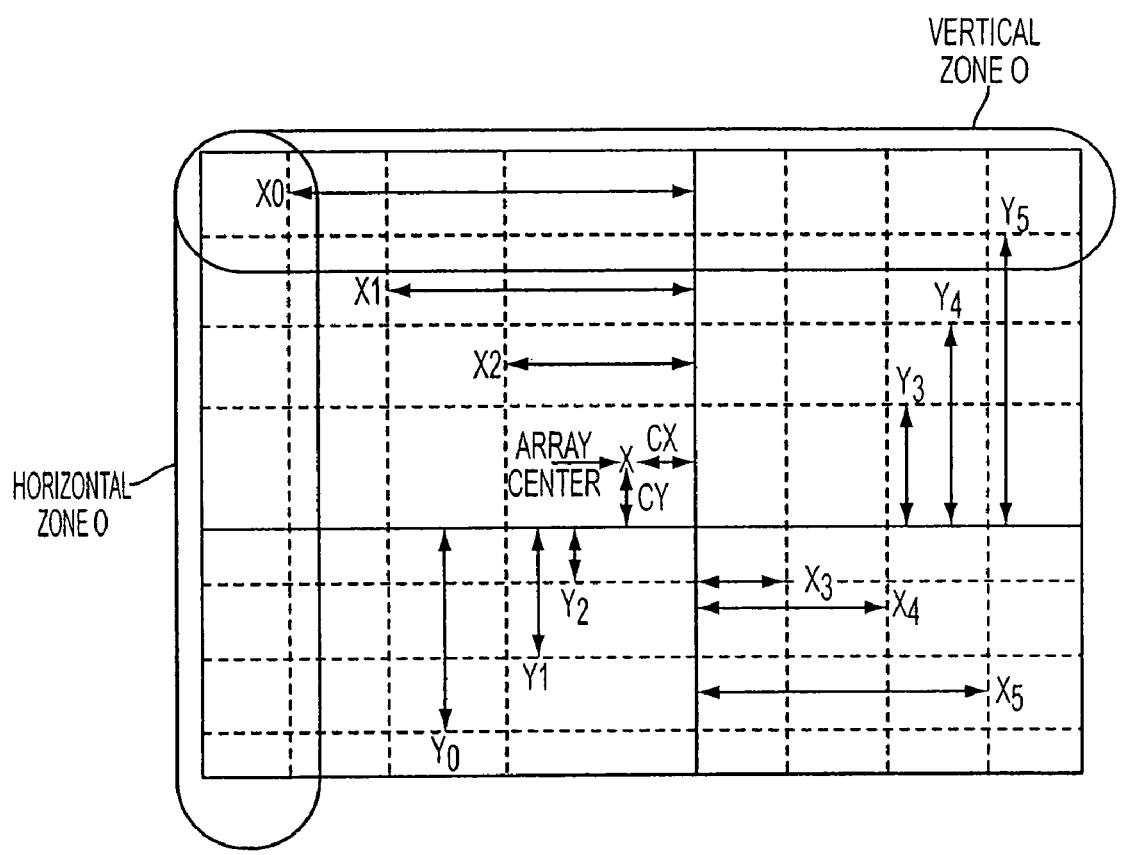
FIG. 5 depicts a pixel array divided into zones, in accordance with an embodiment of the invention.

FIG. 5 depicts a pixel array divided into several zones, in accordance with an embodiment of the invention. The zones depicted in FIG. 5 illustrate how the zone boundaries can be located somewhat arbitrarily, and not necessarily equally or regularly spaced. The boundaries of the zones are programmable and may be modified to another configuration so that correction curves more closely approximating the ideal may be calculated, in accordance with one way of calculating the curves. As depicted, the array is divided into eight different zones in the x-direction (defined by $X_0$ through $X_5$) and eight different zones in the y-direction (defined by $Y_0$ through $Y_5$). The coordinates of zone boundaries are specified relative to the array center as offset by Cx and Cy, which is typically roughly the center point of the lens. The peak value of each channel, however, typically occurs in a different location. The coordinate offsets Cx and Cy are, in turn, applied to the center of the array.

As depicted in FIG. 5, the coordinate offsets Cx and Cy determine roughly the "center" or minima of the lens correction functions in both the x-direction and the y-direction. When the centers of the lens and of the array are roughly aligned, the values of Cx and Cy are typically zero. However, when the center of the array is not aligned with the center of the lens, as is often the case, in accordance with this embodiment of the invention, that misalignment is identified, quantified and taken into account with respect to the zone boundaries. The reason for this "lens centering" with respect to Cx, Cy is to provide an equal number of zones on either side, the idea being that the curves require an equally complex description on either side, and therefore should have the same amount of information used to describe them, on either side. The highlighted zones in FIG. 5 are the first vertical zone 0 and the first horizontal zone 0. The phrases "lens correction," "shading correction," "sensitivity correction," and "positional gain adjustment (PGA)" refer to the process of compensating for slowly-varying, spatially non-uniform sensitivity (or signal response) across pixel positions in an array. Any of these phrases may be used in describing the embodiments illustrated herein.

For a given channel, the corrected pixel signal, P(x, y), is equal to the sensor core 200 sensor-readout pixel value, possibly processed with respect to black level or some other preliminary processing in the color pipeline 120 (FIG. 2), $P_{IN}(x, y)$, multiplied by the correction function, F(x, y) as shown in equation (1) below:

$$P(x,y)=P_{IN}(x,y)*F(x,y). \quad (1)$$

In accordance with an embodiment of the invention, the correction function F(x,y) for a given channel is represented by the following expression:

$$F(x,y)=\theta(x,x^2)+\phi(y,y^2)+k_p*\theta(x,x^2)*\phi(y,y^2)-G, \quad (2)$$

where $\theta(x, x^2)$ represents a piecewise quadratic correction function in the x-direction, where $\phi(y, y^2)$ represents a piecewise quadratic correction function in the y-direction, where $k_p*\theta(x, x^2)*\phi(y, y^2)$ is used to increase/decrease the lens correction values toward the extreme array corners, and where G represents a "global" offset (increase or decrease) applied to every pixel value in the array, regardless of pixel location and zone. It may be desirable to use four separate G values, one for each corner, to further aid in the lens correction (particularly, to aid in correcting any imbalances between Gr and Gb). The expression $k_p*\theta(x, x^2)*\phi(y, y^2)$ is referred to as a "cross-term" while $k_p$ is referred to as the "corner factor," "cross-term coefficient," "cross-term coefficient factor," or similar. Another embodiment of the invention may use a different cross-term. For example, a cross-term can contain other factors or powers of $\theta(x, x^2)$ and/or $\phi(y, y^2)$. Similarly, $k_p$ can be a function of the radius (i.e., distance from the center). The invention may use a cross-term that is any function of x and y that can be calibrated to be zero whenever x or y is zero. The cross-term thus permits variations in F(x,y) in corners, along diagonals, in the interior of each quadrant, and elsewhere other than on the axes, while permitting the other terms in F(x,y) to be calibrated to match the desired PGA correction along the axes. Naturally, a cross-term must be smoothly-varying. The cross-term chosen for an embodiment may vary according to such desired characteristics as the cost, complexity, and the desired degree of matching between F(x, y) and the desired correction surface.

It is desired that positional gain adjustment be done for all channels. In the example embodiment, there are more than the three, standard R, G, and B channels (Gr (green1), Gb (green2), R (red) and B (blue)). In one desired embodiment, the positional gain adjustment uses separate cross-term coefficient factors $k_p$ for each color channel (i.e., p has a range of 0 to 3). That is, there will be four cross-term coefficient factors $k_p$, one each for red, blue, green1 and green2. In another desired embodiment, however, the positional gain adjustment uses separate cross-term coefficient factors $k_p$ for each corner (i.e., quadrant) in each color channel (i.e., p has a range of 0 to 15). That is, as is explained below in more detail, there will be sixteen separate cross-term coefficient factors $k_p$ used in an embodiment of the invention. In a desired embodiment, the cross-term coefficient factors $k_p$ may be set by a calibration routine (described below with reference to FIG. 9). Also, the k-factors should allow for larger values, e.g., up to four to eight times their values used in the prior art, in which only one k factor is used, in order to permit sufficient alteration of a corner to permit achievement of the desired flattening or uniformity of signal response or pixel "sensitivity."

Further, within each zone, the functions $\theta(x, x^2)$ and $\phi(y, y^2)$ may be expressed in the forms $a_ix^2+b_ix+c_i$, and $a_iy^2+b_iy+c_i$, where i is the zone number. The coefficients are different for x and for y; i.e., $a_i$ is different for x than for y; the same is true for $b_i$ and $c_i$.

Functions $\theta$ and $\phi$ are generated for each color (e.g., red, green1, green2, or blue) separately to allow for color-specific correction. In order to generate functions $\theta(x, x^2)$ and $\phi(y, y^2)$, as used in equation (2) above, for each channel, initial values for each of these functions are stored. The initial values are stored for the correction functions, for their "first derivatives," and for their "second derivatives." These initial values are stored in memory (e.g., registers). Initial values are stored, representing those applying to the first pixel of every row and to the first pixel of every column. In addition, for each vertical and each horizontal zone other than the first in each direction, a "second derivative" is stored. Although initial values are specified for each channel, only two channels are used in each line, when using a Bayer pattern.

In a particular direction, horizontal or vertical, the "first derivative" of the correction function for each pixel is the net increase or decrease in the correction function value as compared with the previous pixel of the same color. The first derivatives other than for the second pixel are stored in a register. The correction value for the second pixel of a channel is computed using the stored second initial value for the first derivative. For each next pixel of the same color adjacent to (e.g., to the right of the pixel, the net increase or decrease from the previous pixel correction value (i.e., the first derivative of the third pixel) is read from its register in order to compute the new correction value. In addition, the difference between the first derivatives of consecutive pixels of the same channel in a particular direction, horizontal or vertical, is stored in a register. This difference between the first derivative of a pixel and the first derivative of the next pixel is called the "second derivative" of the correction function (for the next pixel) and is also stored in a register. A color-specific second derivative value is stored for each zone for each channel, and for each direction (horizontal or vertical). Functions 0 and 4) are then produced iteratively (using the values obtained at the previous pixel) using the stored values for the second derivatives, in accordance with the zone assigned to the current pixel. In such a manner, the current second derivative is pulled from storage and added to the current first derivative to get the first derivative for the next pixel. This is the new value for the first derivative register. This first derivative is then added to the current correction value to get the correction value for the next pixel.

For example, with reference to FIG. 5, assume the initial value of a top-left-most red pixel in zone 1 is 100 and the desired correction function value for the next red pixel to the right of the first red pixel is 104. Also assume that the correction function value of the third red pixel immediately to the right of the second red pixel is 110. These values are known in advance since the user already knows the type of lens being used with the array and already knows the optimum correction function values to be applied to each pixel and for each color. The first derivative of the second red pixel is 4 since that is the net difference between the correction function value of the first and second red pixels. The first derivative of the third red pixel is 6 since that is the net difference between the correction function values of the second and third red pixels. In addition, the second derivative of the third pixel is 2 since that is the difference between the respective first derivatives of the second and third red pixels.

In accordance with an embodiment of the invention, the initial values for each channel in each direction for each of the correction functions, the first derivative, and the second derivative for each zone are stored in registers. The second derivative is a constant for a given zone (i.e., for all pixels in a given zone). The second derivative is specified for each zone, for each channel and for each direction. The "initial value of a second derivative" is just another way to describe the second derivative for the first zone for a given channel and direction. As each pixel is read out from the array, the correction function value corresponding to that pixel is calculated and multiplied by the pixel value, resulting in the corrected pixel value, P(x, y). Storing the initial values of the correction functions and their first and second derivatives rather than each and every correction function value requires far less memory capacity. The cross-term coefficient factors $k_p$ are also stored in registers such that they may be recalled when required.

Although the initial values are demonstrated as being assigned to the top left-most pixel, the initial value can be assigned to any pixel in the zone (e.g., the bottom right-most pixel, etc.). In such a case, the pixels may be read out in different directions. In accordance with an embodiment of the invention, the correction values may be introduced into the pixel signals as they are being read out in either normal mode, in mirroring mode (i.e., when the direction in which the pixels are read out is reversed), or in a dual-direction readout mode. Likewise, top and bottom may be reversed.

Also, in accordance with an embodiment of the invention, for a given channel and direction, the second derivative within a given zone does not change. Therefore, the difference between the first derivatives of consecutive pixels in a zone is the same within a given zone. Accordingly, zones may be defined with an aim to minimize the effect of this constraint upon the fidelity with which an implied correction function may match a desired correction function.

It should be noted that under dark conditions, the effects of the correction algorithm should be minimized to avoid noise amplification. The pixel signal being read out has two components; a signal component proportional to the amount of light registered in the pixel circuit and a noise component, which at very low light levels is represented in large extent by a pixel temporal noise. Thus, if one were to apply the correction function to the array in the dark condition, the temporal noise of the pixel array would also be changed. In practice, this would result in the noise component increasing towards the sides of the array. To avoid this artifact, in accordance with an embodiment of the invention, the degree to which the correction algorithm is applied to the pixel signals depends upon the magnitude of the pixel illumination. This could be effectuated by adjusting the G value in equation (2) based on the exposure value for the current scene. That is, in dark conditions, when the degree of lens correction is lessened, the G parameter is increased. As a result, the share of the x, y components in the function F(x, y), and thus noise amplification, is significantly reduced.

Moreover, during preview mode, where the resolution is not as high as in normal mode, the correction algorithm is still employed. Rather than reading out every pixel signal in the array and multiplying each signal by the corresponding correction value, signals from fewer than every pixel (e.g., every other pixel) are read out and multiplied by their corresponding positional gain adjustment value. In this manner, even during preview mode, the pixels of the array that are read out have relatively uniform sensitivity. Changes to the arithmetical operations are effectuated, so as to produce the same correction values, while omitting the usual calculation at each pixel.

As set forth above, in one embodiment of the invention, there will be sixteen cross-term coefficients; there is a set of four coefficients for each corner, where each set includes a coefficient for red, blue, green1 and green2. A switch of the $k_p$ coefficients occurs at quadrant boundaries. Thus, there is a possible discontinuity for the cross-term (i.e., $k_p*\theta(x, x^2)*\phi(y, y^2)$) at quadrant boundaries. The discontinuity may result in image artifacts along the quadrant boundaries. One solution to this potential problem is to calibrate the cross-term coefficients $k_p$ in accordance with an embodiment of the invention discussed below with reference to FIG. 9.

Another solution is for registers or similar forms of storage to specify the center of each channel in each direction. During the scan of the pixels, when a channel crosses one of its axes, the $k_p$ for the new quadrant is used. A calibration is used which makes each channel's $\theta$ nearly equal to zero along each channel's vertical axis, and makes each channel's $\phi$ nearly equal to zero along each channel's horizontal axis. As discussed in the following paragraph, this makes switching $k_p$ invisible on axes.

Another solution is for the embodiment to switch between two coefficients in the horizontal direction when $\theta(x, x^2)$ has its smallest value for a given channel and to switch between two sets of coefficients in the vertical direction when $\phi(y, y^2)$ has its smallest value. $\theta$ and $\phi$ vary slowly, and with proper calibration fall initially, and begin to rise only at a channel's axis, where the function is calibrated to be zero or nearly zero. This would make the cross-term $k_p*\theta(x, x^2)*\phi(y, y^2)$ approximately zero independently of the cross-term coefficient $k_p$. When the cross-term is nearly zero, $k_p$ can be changed, without visible effect. This will make the transition continuous, which will get rid of the image artifacts. As discussed above, in an embodiment of the invention, $k_p$ coefficients for a given channel are switched when θ and/or φ is at a minimum. This point is calibrated to be close to the center of the given channel. Other methods may be used to avoid visible transitions at channel axes. The switching of coefficients may take place at different locations in each channel. This will correct any misalignment between respective centers of the pixel array and associated optical lens, which cause the quadrants to not be aligned from one channel to the next channel.

Figure 6:
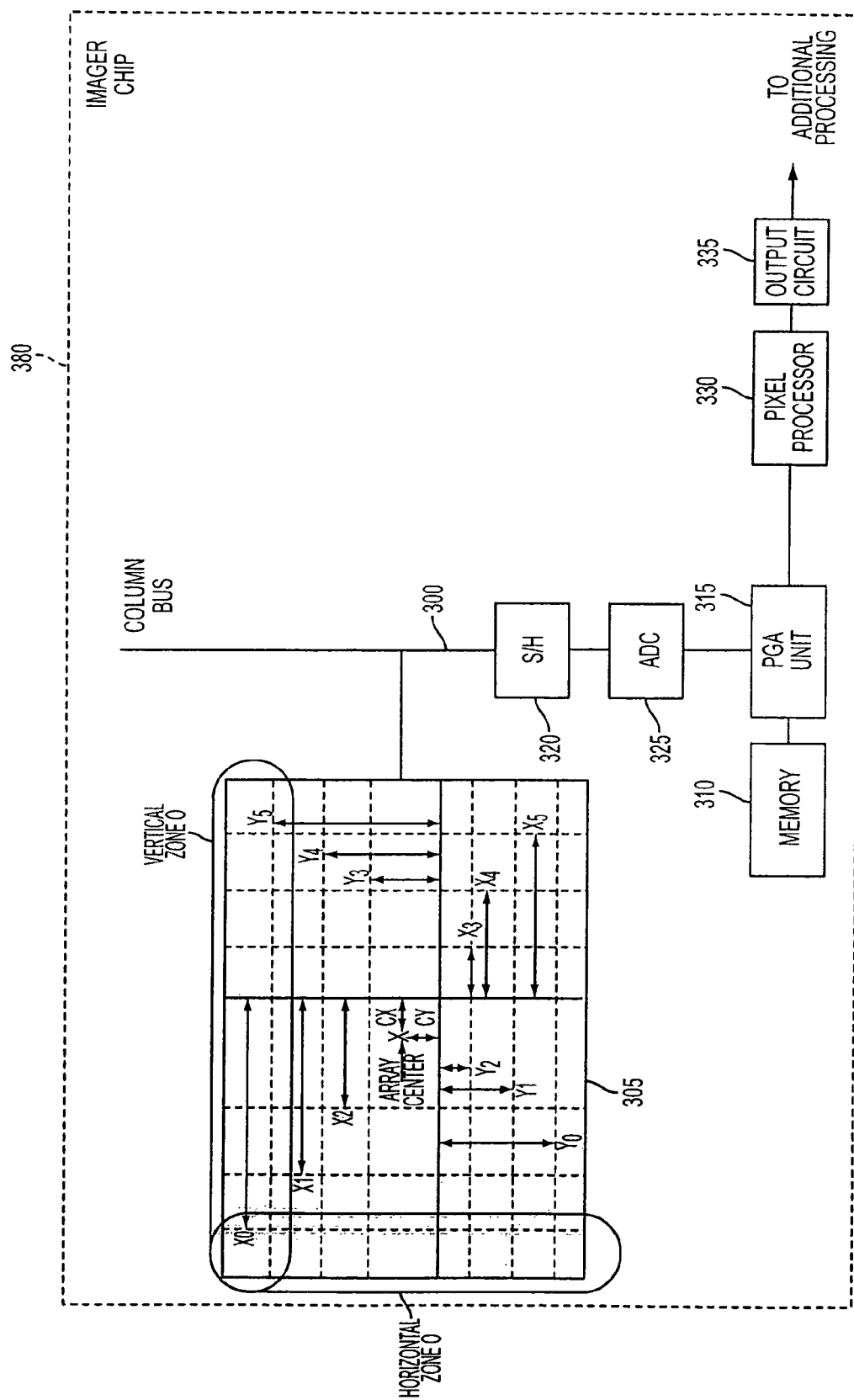
FIG. 6 depicts the FIG. 5 array coupled to readout circuitry.

With reference to FIG. 6, as the pixel values are read from the array 305, they are transferred to processing circuitry via column bus 300, sample/hold circuit 320 and an analog-to-digital converter 325. In accordance with an embodiment of the invention, the pixel values are passed through a positional gain adjustment unit (PGA) 315, which calculates correction function values from input parameters and multiplies the respective pixel values, as they are read out from the array 305, by the appropriate correction function values. This process compensates for the inherent differences in sensitivity for the pixels and generates a truer image. The PGA unit 315 may be part of the color pipeline 120 illustrated in FIG. 2. Memory 310 (e.g., registers, etc.) stores the zone boundaries and center offset, the initial values of the correction functions, and the first derivative and the second derivative of the respective correction functions for each zone, etc. As a result, the memory 310 need not store every correction function value of every pixel, but only the "roadmap" of how to get to those values. Thereafter, the corrected pixel signals are forwarded to pixel processor 330 and output circuit 335 as discussed above. It will be appreciated that in one embodiment the PGA unit 315 can be a separate integrated circuit and not embodied on a common die with the pixel array 305. Further embodiments of the present invention provide the PGA unit 315 as software code executed to process color channel data that has been stored in memory. That is, the correction process can be performed 'real time' as an image is captured by a sensor, or processed at a later time.

FIG. 6 also depicts the pixel array 305 as being integrated onto or within an integrated circuit (IC) chip 380. The chip 380 may be made of any material suitable for use with pixel sensor arrays, including silicon-based materials, glass-based materials, etc. The chip 380 may also include the other system-on-a-chip image sensor 100 components discussed above and illustrated in FIGS. 2 and 3 (which are left out in FIG. 6 for convenience purposes only). For example, sample/hold circuit 320 may be part of circuitry 208 (FIG. 3). In one embodiment a PGA (Positional Gain Adjustment) unit operates in the digital domain, after the ADC, and as part of the pixel processor, or alternatively preceding the pixel processor. In another embodiment, the PGA unit 315 need not be a separate component but may be a part of the pixel processor 330 and it need not be provided on the same chip as the pixel array 305.

Figure 7:
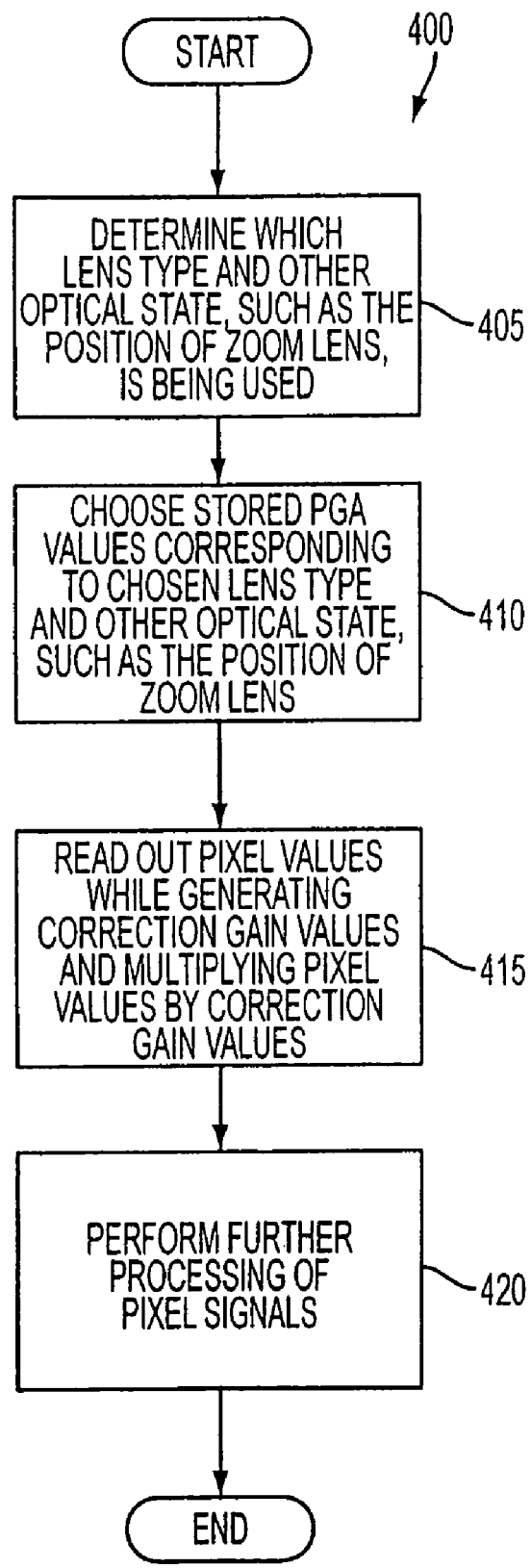
FIG. 7 depicts a flowchart describing a positional gain adjustment method in accordance with an embodiment of the invention.

FIG. 7 depicts a flowchart illustrating a positional gain adjustment method 400 in accordance with an embodiment of the invention. The operation begins at segment 405 where a determination is made by the positional gain adjustment unit or external unit as to which lens type, of the plurality of lens types, and other optical state, such as the position of a zoom lens, capable of being used with the positional gain adjustment unit, is currently being used in the application. At segment 410, the zone boundaries of the pixel array and positional gain adjustment parameters such as derivatives and/or initial values are loaded into registers, depending on which lens type and other optical state, such as the position of a zoom lens, has been selected.

At segment 415, the pixels of the pixel array 305 are read out while being multiplied by their respectively assigned correction gain values. Further processing of the pixel signals by the pixel processor is performed at segment 420 before the process 400 ends.

Figure 8:
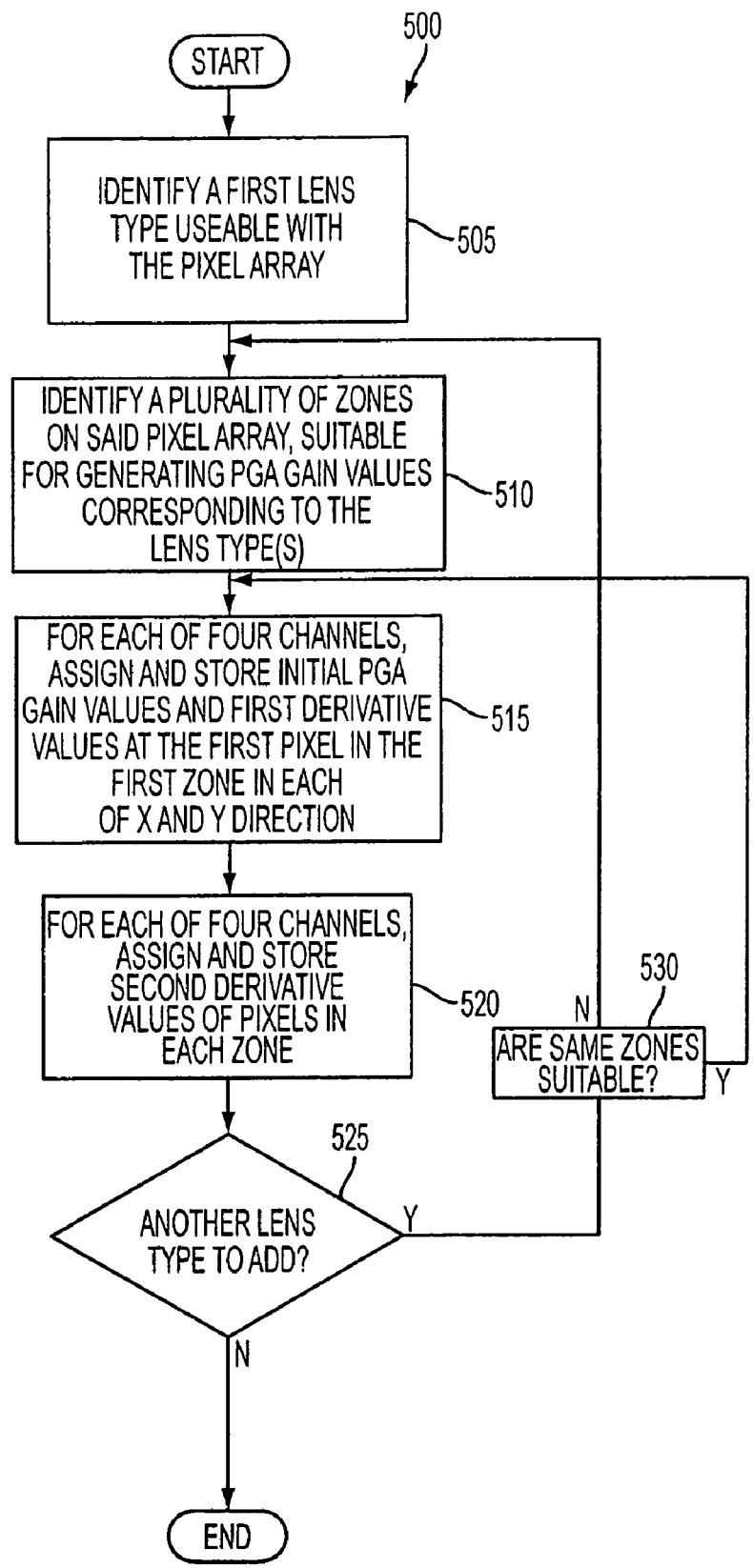
FIG. 8 depicts a flowchart describing a calibration method, i.e., for generating positional gain adjustment factors, in accordance with an embodiment of the invention, but with no corner factors.

FIG. 8 depicts a flowchart demonstrating a method 500 for generating the positional gain adjustment parameters in accordance with an embodiment of the invention. This calibration method 500 is the general method; another method described in more detail below is a special case. The method 500 begins at segment 505 where a determination is made as to which lens type(s) is being used for the application. At segment 510, for a selected lens type, a plurality of zones are identified into which the pixels of the pixel array 305 are divided. In accordance with an embodiment of the invention, the boundaries of the zones, as well as the number of zones, are programmable based on the type(s) of lens being used.

At segment 515, for each of the four channels, initial PGA gain values and first derivatives at the first pixel in the first zone in each of the x and y directions are stored in memory (e.g., registers). At segment 520, for each of the four channels, second derivative values are generated and stored for each zone of the pixel array. At segment 525, a determination is made as to whether there is another lens type to add to the algorithm. If not, then the method 500 ends. If the same zones are suitable (segment 530), then the method 500 returns to segment 515. If not, then the method returns to segment 510.

Figure 9:
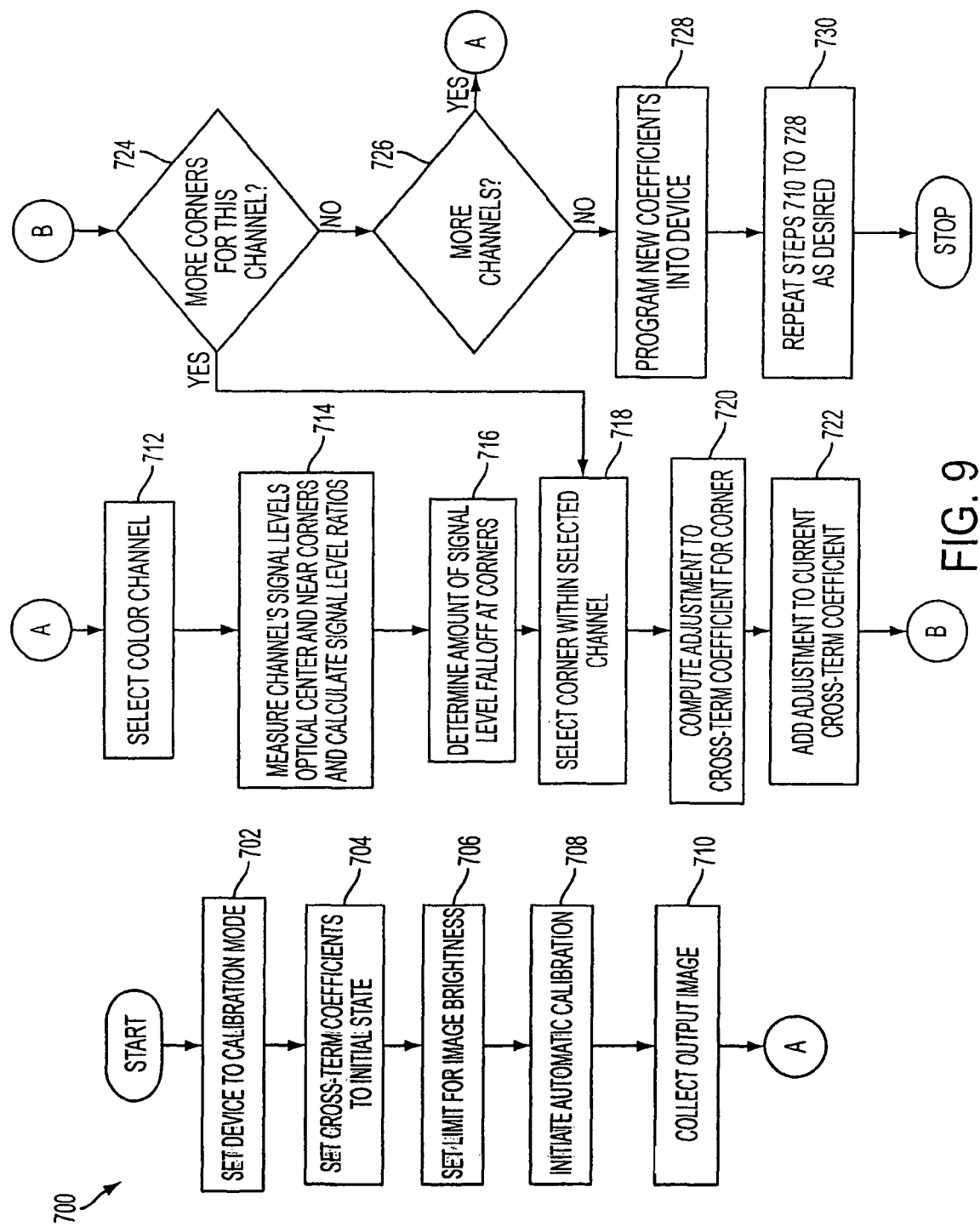
FIG. 9 depicts a flowchart of an additional calibration method in accordance with an embodiment of the invention using corner factors.

FIG. 9 depicts a flowchart of a calibration method 700 in accordance with another embodiment of the invention. Initially, the imaging device is set to a calibration mode in which a PGA-corrected image is output from the chip without further processing (segment 702) beyond PGA. This way, the method 700 can measure the results of the current PGA parameters precisely and can also measure all four color channels independently. Next, an operator sets all of the cross-term coefficients to an initial state (segment 704). The initial state can comprise all zeros. The operator can then select how much image brightness may be allowed to fall off from the brightest value at the optical center (i.e., sets a limit for the image brightness falloff), if desired (segment 706). If the operator does not set an image brightness falloff limit, a default value may be used. The operator may then initiate the following automatic calibration steps (segment 708). The term "brightness" refers to the signal level within a channel.

At segment 710, an output image is collected from the imaging device. Since the automatic calibration portion is performed separately for all four color channels, at segment 712, a color channel is selected. Then, the signal level of the image is measured at the center and at points near the four corners (segment 714). In addition, ratios of the corner level/center level are computed. At segment 716, the desired amount of falloff at the corners is computed based on the input image brightness falloff limit (from segment 706).

At this point, the following segments are performed for each corner within the selected color channel. As such, at segment 718, a corner is selected. An adjustment for the cross-term coefficient is computed at segment 720. The adjustment is calculated as follows:

$$\Delta k = 0.75*(ke-kc), \quad (3)$$

where kc is the current cross-term coefficient and ke is the estimated coefficient based on the following equation:

$$ke=(falloff*gain/Z-1.0-\theta(x,x^2)-\phi(y,y^2))/(\theta(x,x^2)/\phi(y,y^2)), \quad (4)$$

where Z is the relative signal level at the corner location, falloff is the falloff entered by the operator, and gain is the current total lens correction as defined by:

$$\text{gain} = 1 + \theta(x,x^2) + \phi(y,y^2) + kc*\theta(x,x^2)*\phi(y,y^2). \quad (5)$$

The adjustment $\Delta k$ is then added to the current cross-term coefficient for the corner (segment 722). This adjusted coefficient is closer to the ideal, yet still unknown, coefficient for the corner. It is then determined if there are more corners to process for the selected color channel (segment 724). If there are more corners for the selected color channel, the method 700 continues at segment 718, where a new corner within the selected color channel is selected. If all of the corners for the selected channel have been processed, the method 700 continues at segment 726 to determine if there are more channels to process.

If at segment 726, it is determined that there are more color channels to process, the method 700 continues at segment 712 where another color channel is selected. If at segment 726, it is determined that there are no more color channels to process, the method 700 continues at segment 728 where the new cross-term coefficients are programmed into the device so that the device may produce a new image based on the new coefficients. At segment 730, segments 710 to 728 are repeated as desired. Typically, calibration segments 710 to 728 are repeated a few times to obtain the optimal cross-term coefficients.

Figure 10:
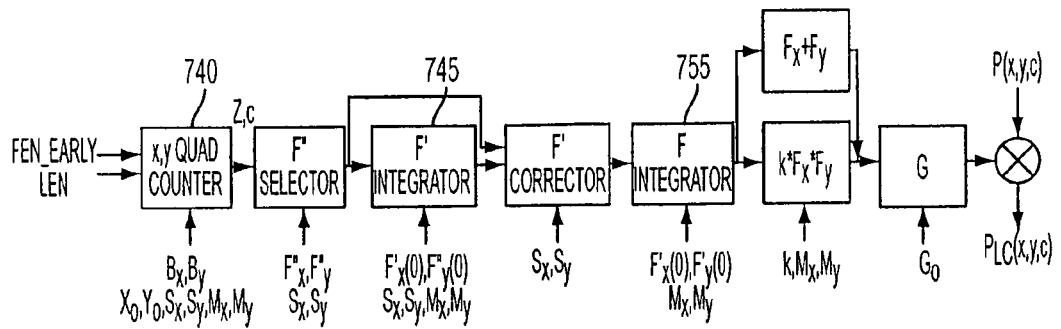
FIG. 10 depicts a block diagram of a pipeline implementing lens shading correction in accordance with an embodiment of the invention.

FIG. 10 shows a block diagram of a pipeline implementing lens shading correction in accordance with another embodiment of the invention. The embodiment calculates the gain or current total lens correction as defined by:

$$P_{LC}(x,y,c) = P(x,y,c) \quad (6)$$

$$G(x,y,c) = G_0(c) + F_x(x,c) + F_y(y,c) + k(x,y,c)*\max(F_x(x,c) - a,0)*\max(F_y(y,c) - a,0), \quad (7)$$

where c is the color channel index, $G_0$ is the overall gain for each color, $F_x$ specifies the horizontal correction, $F_y$ specifies the vertical correction, k is the corner correction factor for each corner for each color channel, and a is a cross term pedestal, which is typically set to 0 or a positive value. The gain value may be used as the pixel array reads out pixel values in various ways discussed below, such as including but not limited to reading a pixel value in forward direction, in reverse, mirrored order (horizontally, vertically, or both), or by skip mode.

As illustrated in FIG. 10, the pipeline used may be color pipeline 120 as shown in FIG. 2. In the figure, $X_0$ and $Y_0$ designate horizontal and vertical readout start location coordinates, $S_x$ and $S_y$ designate horizontal and vertical skip mode configuration signals, and $M_x$ and $M_y$ designate horizontal and vertical mirror mode configuration signals. The readout start location functionality is implemented by clocking the pipeline ahead of the frame and line valid signals coming in (before block 740). The integrators are primed to reach the value of $X_0$ and $Y_0$. At this moment, the pipeline is stopped and awaits the first pixel from the pixel array to come in (from array 202 in sensor core 200 as shown in FIG. 3). To accelerate the priming sequence, the pipeline stepping is done using the maximum implemented skip.

The image sensor, when reading pixel values by skip mode, reads the images faster because some pixels are "skipped" and not read, but other pixels are read. The skip modes for reading out pixel values are supported as follows. The pipeline is required to adjust the gain in larger steps. For implementation simplification purposes, boundaries $B_x$ and $B_y$ (block 740) are constrained so that they can be on a grid defined by the largest skip factor supported. For example, if 16× is the largest skip mode supported, $B_x$ and $B_y$ defining quad locations can be set to values 0, 32, 64, and so on. F'(block 745) are calculated as multiples of F":

$$F'(i) = F'(i-1) + S*F''(i-1). \quad (8)$$

F (block 755) are calculated as multiples of F' with a correction term added:

$$F(i) = F(i-1) + S*F'(i-1) + F''*S^2/2. \quad (9)$$

Figure 11:
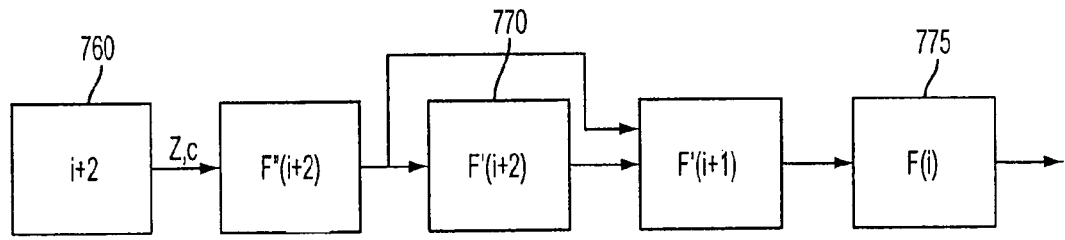
FIG. 11 depicts the FIG. 10 pipeline in a forward direction.
Figure 12:
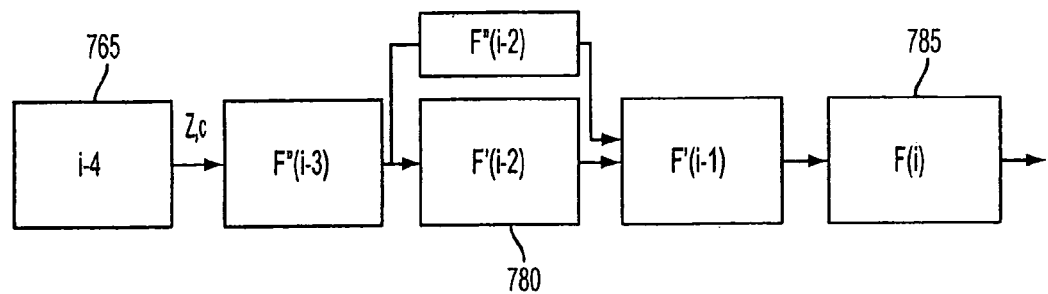
FIG. 12 depicts the FIG. 10 pipeline in a reverse direction.

Mirror modes for reading out pixel values are supported by pre-stepping the pipeline in the location where the readout starts, $X_0$ and $Y_0$, and reversing the pipeline. Reversed direction indicates that the pipeline works in the reversed direction and the order of the pixels are backwards, e.g., pixel2, pixel1, pixel0, etc., (i.e., the sensor image is read out in mirror mode). This differs from the forward direction discussed above in which the pixels are read in the order pixel0, pixel1, pixel2, etc. Subtraction replaces addition when the pipeline works in the reversed direction. Reversing the pipeline causes the values in pipeline stages to count back iteratively, so that the set of the following formulas is calculated:

$$F_x(x-1,c) = F_x(x,c) - F_x'(x-1,c) \quad (10)$$

$$F_y(y-1,c) = F_y(y,c) - F_y'(y-1,c) \quad (11)$$

$$F_x'(x-1,c) = F_x'(x,c) - F_x''(x-1,c) \quad (12)$$

$$F_y'(y-1,c) = F_y'(y,c) - F_y''(y-1,c) \quad (13)$$

where $F_x$ represents $\theta$ and $F_y$ represents $\phi$. The reversal is carried out by stalling the pipeline stages, configuring the quad counter to count down (block 765) instead of up (block 760), the integrators to perform subtraction (blocks 780 and 785) instead of addition (blocks 770 and 775) and then unstalling the blocks from left to right one by one to bring the pixel index in the required state as specified by the formulas above and illustrated in FIGS. 11 and 12.

Other optimizations can include the vertical correction functions being calculated during line blank and re-using the pipeline hardware utilized to calculate the horizontal correction. Another optimization includes the pipeline being primed before the frame starts using the FEN_EARLY signal, typically during dark row readout. The pipeline is clocked until the value of G(0, 0) reaches the output multiplier. At this point the pipeline is stopped and can resume its operation once the first pixel for the new frame comes from the pixel array. This allows to reduce the effective pipeline delay visible at the pixel input. Another optimization includes the output multiplier being reused to pre-calculate the $F_y*k$ term during horizontal blanking.

Figure 13:
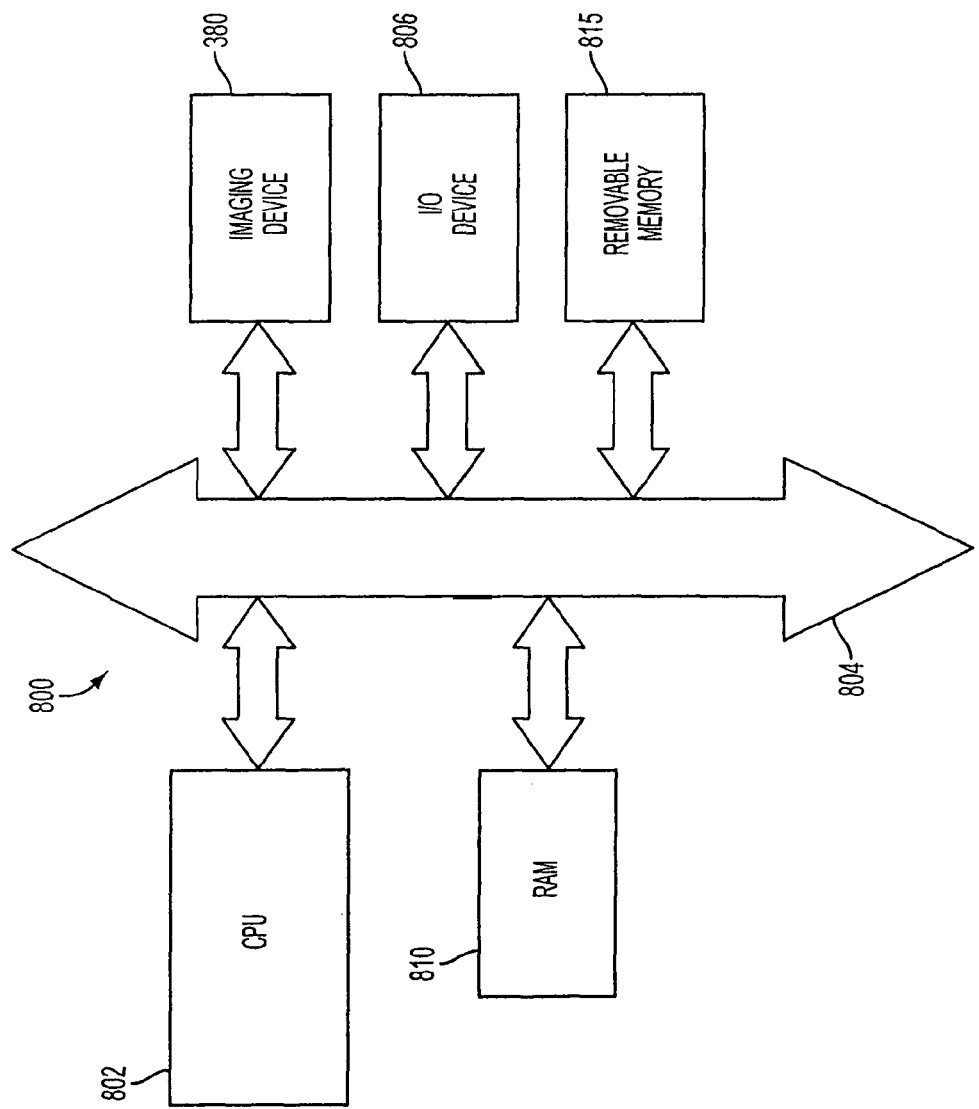
FIG. 13 depicts a processor system constructed in accordance with an embodiment of the invention.

FIG. 13 shows system 800, a typical processor system modified to include an image sensor 380 (FIG. 6) constructed and operated in accordance with an embodiment of the invention. The processor system 800 is an example of a system having digital circuits that could include image sensor devices. Without being limiting, such a system could include a computer system, camera system, scanner, machine vision system, vehicle navigation system, video phone, surveillance system, auto focus system, star tracker system, motion detection system, image stabilization system, etc.

System 800, for example a camera system, generally comprises a central processing unit (CPU) 802, such as a microprocessor, that communicates with an input/output (I/O) device 806 over a bus 804. Image sensor 380 also communicates with the CPU 802 over the bus 804. The processor system 800 also includes random access memory (RAM)

810, and can include removable memory 815, such as flash memory, which also communicate with the CPU 802 over the bus 804. Image sensor 380 contains a positional gain adjustment unit 315, as illustrated in FIG. 6, and implements the various methods of the embodiments of the invention (described above). Image sensor 380 may be combined with a processor, such as a CPU 802, digital signal processor, or microprocessor, in a single integrated circuit. Some of the functions of image sensor 380 and/or embodiment may be performed by processor system 800 (e.g., determining optical state and loading appropriate PGA parameters e.g., when using a zoom lens).

As described above, the disclosed method provides zones having flexible boundaries which can be reconfigured depending upon the optics, including type of lens, being used in a given application. The disclosed method also provides for a method in which initial values of correction functions are stored and when pixel signals are read out from the array, the correction functions are calculated and applied to those signals while minimizing required storage. In addition, the calibration method may select zone boundaries based upon any offsets between the center of the lens being used and the center of the pixel array, as may be required by an optics design or by the chip layout. Further, adjustments to the degree with which the gains calculated by the correction algorithm are applied, depending upon the quantity of light the pixel is exposed to is also disclosed.

While the invention has been described in detail in connection with embodiments known at the time, it should be readily understood that they are not limited to the disclosed embodiments. Rather, they can be modified to incorporate any number of variations, alterations, substitutions or equivalent arrangements not heretofore described. For example, while embodiments of the invention are described in connection with a CMOS pixel imager, they can be practiced with any other type of pixel imager (e.g., CCD, etc.) or image source. In addition, although embodiments of the invention are described in connection with eight programmable zones in each of the x-direction and the y-direction, they can be practiced with any number of zones, programmable or not, or with no zones at all. Likewise, the correction function may be computed in a manner different from that described, and calibrated in a different manner. In addition, a separate center may be specified for each channel to trigger an alternative mechanism for switching $k_p$ values. Further, the invention may operate independently of an image sensor. Additionally, three or five channels, or any number of channels may be used, rather than four, for example, and they may comprise additional or different colors/channels than R, G, G1, G2, or B, such as, Cyan Magenta Yellow (CMY), Cyan Magenta Yellow Black (CMYK), or Red Green Blue Indigo (RGBI). Further, a different calibration procedure may be employed.

The invention claimed is:

1. An imaging device, comprising:
a pixel array, the pixel array outputting a plurality of pixel signals over a plurality of color channels, the pixel signals comprising four quadrants; and
a positional gain adjustment unit coupled to the pixel array for correcting sensitivity of pixels in the array by applying respective positional gain adjustment values to the pixel signals,
wherein the positional gain adjustment values use cross-terms that are different for each quadrant and each color channel, the cross-terms comprise constant cross-term coefficient factors and a separate constant cross-term coefficient factor is used for each quadrant of each color channel.

2. The imaging device of claim 1, wherein the positional gain adjustment values are generated by dividing the pixel array into a plurality of zones, each of the plurality of zones containing more than one pixel.

3. The imaging device of claim 2, wherein the positional gain adjustment values are generated by dividing the pixel array into a first number of zones when the pixel array is used with a first type of lens, wherein each of the first number of zones respectively contains a plurality of pixels of the pixel array.

4. The imaging device of claim 3, wherein the positional gain adjustment values are generated by dividing the pixel array into a second number of zones different from the first number of zones, when the pixel array is used with a second type of lens different from the first type of lens, and
wherein each of the second number of zones respectively contains a plurality of pixels of the pixel array different from the pixels associated with the first number of zones.

5. The imaging device of claim 1, wherein the positional gain adjustment unit is configured to correct for any misalignment between respective centers of the pixel array and a lens used with the pixel array and/or to adjust a degree of correction depending upon an amount of light received by the pixel array.

6. An imaging device, comprising:
a pixel array, the pixel array outputting a plurality of pixel signals over a plurality of color channels, the pixel signals comprising four quadrants; and
a positional gain adjustment unit coupled to the pixel array for correcting sensitivity of pixels in the array by applying respective positional gain adjustment values to the pixel signals,
wherein the positional gain adjustment values use cross-terms that are different for each quadrant and each color channel, the cross-terms comprise cross-term coefficient factors and a separate cross-term coefficient factor is used for each quadrant of each color channel,
wherein one or more cross-term coefficient factors are switched among potential values when a signal associated with horizontal position is at its minimum.

7. An imaging device, comprising:
a pixel array, the pixel array outputting a plurality of pixel signals over a plurality of color channels, the pixel signals comprising four quadrants; and
a positional gain adjustment unit coupled to the pixel array for correcting sensitivity of pixels in the array by applying respective positional gain adjustment values to the pixel signals,
wherein the positional gain adjustment values use cross-terms that are different for each quadrant and each color channel, the cross-terms comprise cross-term coefficient factors and a separate cross-term coefficient factor is used for each quadrant of each color channel,
wherein one or more cross-term coefficient factors switch values when a signal associated with vertical position is at its minimum.

8. An imaging device, comprising:
a pixel array; and
a programmable positional gain adjustment unit coupled to the pixel array for applying correction factors to pixel signals readout from the pixel array, the programmable positional gain adjustment unit determining and applying correction factors based on pixel color and which quadrant, of the pixel's color channel, contains the pixel, wherein the correction factors comprise cross-term coefficient factors for each quadrant and a separate cross-term coefficient factor is used for each quadrant for each color channel, wherein one or more cross-term coefficient factors are switched among potential values when a signal associated with a vertical position is at its minimum and/or wherein one or more cross-term coefficient factors are switched among potential values when a signal associated with a horizontal position is at its minimum.

9. The imaging device of claim 8, wherein the programmable positional gain adjustment unit is configured to divide the pixel array into a plurality of zones and wherein boundaries of the plurality of zones are programmable depending upon a type of lens being used with the pixel array.

10. A positional gain adjustment unit comprising:
an input coupled to receive color channel pixel data representing data output of one or more imaging device arrays, wherein data points of each color channel pixel data correspond to locations of color sensitive pixels of the imaging device arrays; and
correction circuitry for applying correction factors to the color channel data, the correction circuitry being adapted to apply correction factors based on quadrant location of the data points relative to the imaging device array for the respective channel, where quadrants may have different origins for each channel, even if they share an array, wherein the correction factors comprise cross-terms and constant cross-term coefficient factors that are separately assignable for each quadrant of each color channel.

11. The positional gain adjustment unit of claim 10 wherein the correction factor is stored as a first derivative.

12. The positional gain adjustment unit of claim 11 wherein the first derivative is a net increase or decrease in a correction function value as compared with a previous pixel of a same color.

13. The positional gain adjustment unit of claim 10 wherein the correction factor is stored as a second derivative.

14. The positional gain adjustment unit of claim 13 wherein the second derivative is a difference between a first derivative of a first pixel and a first derivative of a second pixel.

* * * * *